UNITED STATES PATENT OFFICE.

FELIX HOFFMANN, OF ELBERFELD, GERMANY, ASSIGNOR TO THE FARBEN-FABRIKEN OF ELBERFELD COMPANY, OF NEW YORK.

ACETYL SALICYLIC ACID.

SPECIFICATION forming part of Letters Patent No. 644,077, dated February 27, 1900.

Application filed August 1, 1898. Serial No. 687,385. (Specimens.)

*To all whom it may concern:*

Be it known that I, FELIX HOFFMANN, doctor of philosophy, chemist, (assignor to the FARBENFABRIKEN OF ELBERFELD COMPANY, of New York,) residing at Elberfeld, Germany, have invented a new and useful Improvement in the Manufacture or Production of Acetyl Salicylic Acid; and I hereby declare the following to be a clear and exact description of my invention.

In the *Annalen der Chemie und Pharmacie*, Vol. 150, pages 11 and 12, Kraut has described that he obtained by the action of acetyl chlorid on salicylic acid a body which he thought to be acetyl salicylic acid. I have now found that on heating salicylic acid with acetic anhydride a body is obtained of which are perfectly different from those of the body described by Kraut. According to my researches the body obtained by means of my new process is undoubtedly the real acetyl salicylic acid

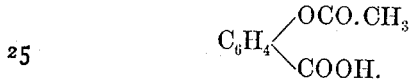

Therefore the compound described by Kraut cannot be the real acetyl salicylic acid, but is another compound. In the following I point out specifically the principal differences between my new compound and the body described by Kraut.

If the Kraut product is boiled even for a long while with water, (according to Kraut's statement,) acetic acid is not produced, while my new body when boiled with water is readily split up, acetic and salicylic acid being produced. The watery solution of the Kraut body shows the same behavior on the addition of a small quantity of ferric chlorid as a watery solution of salicylic acid when mixed with a small quantity of ferric chlorid—that is to say, it assumes a violet color. On the contrary, a watery solution of my new body when mixed with ferric chlorid does not assume a violet color. If a melted test portion of the Kraut body is allowed to cool, it begins to solidify (according to Kraut's statement) at from 118° to 118.5° centigrade, while a melted test portion of my product solidifies at about 70° centigrade. The melting-points of the two compounds cannot be compared, because Kraut does not give the melting-point of his compound. It follows from these details that the two compounds are absolutely different.

In producing my new compound I can proceed as follows, (without limiting myself to the particulars given:) A mixture prepared from fifty parts of salicylic acid and seventy-five parts of acetic anhydride is heated for about two hours at about 150° centigrade in a vessel provided with a reflux condenser. Thus a clear liquid is obtained, from which on cooling a crystalline mass is separated, which is the acetyl salicylic acid. It is freed from the acetic anhydride by pressing and then recrystallized from dry chloroform. The acid is thus obtained in the shape of glittering white needles melting at about 135° centigrade, which are easily soluble in benzene, alcohol, glacial acetic acid, and chloroform, but difficultly soluble in cold water. It has the formula

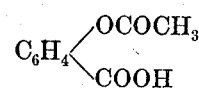

and exhibits therapeutical properties.

Having now described my invention and in what manner the same is to be performed, what I claim as new, and desire to secure by Letters Patent, is—

As a new article of manufacture the acetyl salicylic acid having the formula:

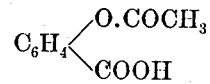

being when crystallized from dry chloroform in the shape of white glittering needles, easily soluble in benzene, alcohol and glacial acetic acid, difficultly soluble in cold water, being split by hot water into acetic acid and salicylic acid, melting at about 135° centigrade, substantially as hereinbefore described.

In testimony whereof I have signed my name in the presence of two subscribing witnesses.

FELIX HOFFMANN.

Witnesses:
  R. E. JAHN,
  OTTO KÖNIG.